United States Patent
Murugan

(10) Patent No.: US 11,915,175 B2
(45) Date of Patent: *Feb. 27, 2024

(54) SYSTEM AND METHOD FOR ALLOCATING MANUFACTURED PRODUCTS TO SELLERS USING PROFITABLE ORDER PROMISING

(71) Applicant: Blue Yonder Group, Inc., Scottsdale, AZ (US)

(72) Inventor: Arvindh Murugan, Flower Mound, TX (US)

(73) Assignee: Blue Yonder Group, Inc., Scottsdale, AZ (US)

( * ) Notice: Subject to any disclaimer, the term of this patent is extended or adjusted under 35 U.S.C. 154(b) by 792 days.

This patent is subject to a terminal disclaimer.

(21) Appl. No.: 16/940,126

(22) Filed: Jul. 27, 2020

(65) Prior Publication Data

US 2020/0356933 A1 Nov. 12, 2020

Related U.S. Application Data

(63) Continuation of application No. 15/918,138, filed on Mar. 12, 2018, now Pat. No. 10,726,369, which is a continuation of application No. 13/735,658, filed on Jan. 7, 2013, now Pat. No. 9,916,550, which is a continuation of application No. 12/108,947, filed on Apr. 24, 2008, now Pat. No. 8,352,336.

(Continued)

(51) Int. Cl.
*G06Q 30/00* (2023.01)
*G06Q 10/0631* (2023.01)
*G06Q 10/087* (2023.01)
*G06Q 30/08* (2012.01)

(52) U.S. Cl.
CPC ..... *G06Q 10/06315* (2013.01); *G06Q 10/087* (2013.01); *G06Q 30/08* (2013.01)

(58) Field of Classification Search
CPC . G06Q 10/06315; G06Q 10/087; G06Q 30/08
USPC ................................................. 705/28
See application file for complete search history.

(56) References Cited

U.S. PATENT DOCUMENTS 6,167,380 A * 12/2000 Kennedy ............ G06Q 30/0202
705/28
6,338,053 B2 1/2002 Uehara et al.
(Continued)

FOREIGN PATENT DOCUMENTS

TW 200519676 6/2005
TW 200602933 1/2006

OTHER PUBLICATIONS

Search Report for Taiwan Invention Patent Application No. 097115967, dated Feb. 25, 2014.
(Continued)

*Primary Examiner* — Rokib Masud
(74) *Attorney, Agent, or Firm* — Spencer Fane LLP; Steven J. Laureanti

(57) ABSTRACT

A system and method is disclosed for allocating products to one or more sellers. The system includes a database operable to store data associated with one or more enterprises. The system further includes an order promising system coupled with the database and operable to model the flow of the products through the one or more enterprises and allocate resources to the one or more sellers based on the modeled flow of the products.

20 Claims, 3 Drawing Sheets

Related U.S. Application Data

(60) Provisional application No. 60/915,227, filed on May 1, 2007.

(56) References Cited

U.S. PATENT DOCUMENTS

| | | | |
|---|---|---|---|
| 6,934,594 B2 | 8/2005 | Loring et al. | |
| 6,963,847 B1 | 11/2005 | Kennedy et al. | |
| 7,050,990 B1 | 5/2006 | Chu et al. | |
| 7,058,587 B1 | 6/2006 | Horne et al. | |
| 7,085,729 B1 | 8/2006 | Kennedy et al. | |
| 7,130,707 B2 | 10/2006 | Chao et al. | |
| 7,197,469 B2 | 3/2007 | Jegde et al. | |
| 7,212,976 B2 * | 5/2007 | Scheer | G06Q 30/06 705/28 |
| 7,249,044 B2 | 7/2007 | Kumar et al. | |
| 7,299,201 B2 | 11/2007 | Jammes et al. | |
| 7,305,419 B1 | 12/2007 | Cosby et al. | |
| 7,308,416 B2 | 12/2007 | Peachey-Kountz et al. | |
| 7,324,966 B2 * | 1/2008 | Scheer | G06Q 10/087 705/28 |
| 7,379,781 B2 | 5/2008 | Treichler et al. | |
| 7,386,358 B2 | 6/2008 | Geroulo | |
| 7,444,295 B2 | 10/2008 | Peachey-Kountz et al. | |
| 7,493,184 B2 | 2/2009 | Geroulo | |
| 7,577,577 B2 | 8/2009 | Lyon et al. | |
| 7,584,113 B2 | 9/2009 | Denton et al. | |
| 7,657,534 B2 | 2/2010 | Kirkegaard | |
| 7,881,985 B2 | 2/2011 | Yang et al. | |
| 7,921,061 B2 | 4/2011 | Rangarajan et al. | |
| 8,352,300 B2 | 1/2013 | Notani et al. | |
| 8,600,821 B2 | 12/2013 | Borders et al. | |
| 10,311,455 B2 | 6/2019 | Notani et al. | |
| 10,373,081 B2 | 8/2019 | Crawford et al. | |
| 2002/0042755 A1 | 4/2002 | Kumar et al. | |
| 2002/0095307 A1 | 7/2002 | Greamo et al. | |
| 2003/0172007 A1 | 9/2003 | Helmolt et al. | |
| 2004/0068430 A1 * | 4/2004 | Peachey-Kountz | G06Q 10/06315 705/7.12 |
| 2004/0139001 A1 | 7/2004 | Henriques et al. | |
| 2005/0177435 A1 | 8/2005 | Lidow | |
| 2006/0085296 A1 | 4/2006 | Strickland | |
| 2007/0112945 A1 | 5/2007 | Brown et al. | |
| 2018/0049043 A1 | 2/2018 | Hoffberg | |

OTHER PUBLICATIONS

Ray, Saibal. Lead time management in supply chains. Diss. University of Waterloo (Canada), 2001. ABI/INFORM Global, ProQuest. Web. Jul. 25, 2012.

* cited by examiner

| ATP BUCKETS | SUPPLY | WEEK 1 | WEEK 2 | WEEK 3 | WEEK 4 | WEEK 5 | WEEK 6 | WEEK 7 | WEEK 8 | WEEK 9 | WEEK 10 | WEEK 11 | WEEK 12 |
|---|---|---|---|---|---|---|---|---|---|---|---|---|---|
| | FP MANUFACT. — 511 | 0̸ | 0̸ | 0̸ | 0̸ | 0̸ | 0̸ | 0̸ | 0 | 0 | 0 | 0 | 0 |
| | FP IN-PROCESS — 512 | 10 | 10 | 9 | 12 | 13 | 13 | 12 | 14 | 11 | 10 | 9 | 8 |
| | FP TOTAL — 513 | 20 | 19 | 18 | 22 | 21 | 22 | 21 | 14 | 11 | 9 | 9 | 8 |
| | IP MANUFACT. — 514 | 20 | 19 | 18 | 11/X | 20 | 18/X | 6/20 | 21 | 18/22 | 23 | 25 | 11 |
| | IP IN-PROCESS — 515 | 10 | 10 | 10 | 10 | 10 | 10 | 10 | 10 | 10 | 10 | 10 | 10 |
| | IP TOTAL — 516 | 20 | 19 | 28 | 27 | 30 | 29 | 30 | 31 | 32 | 33 | 35 | 21 |
| | RES — 517 | 10 | 11 | 12 | 7/X | 13 | 11/X | 0̸ | 11 | 6/X | 9 | 8 | 7 |
| | RM1 — 518 | 10 | 10 | 10 | 10 | 10 | 10 | 10 | 10 | 10 | 10 | 10 | 10 |
| | RM2 — 519 | 11 | 11 | 11 | 11 | 11 | 11 | 11 | 11 | 11 | 11 | 11 | 11 |

510

| ALLOCATION | | MONTH 1 | MONTH 2 | MONTH 3 |
|---|---|---|---|---|
| RES | TOTAL SUPPLY — 521 | 46 | 50 | 34 |
| TOP SELLER | TOTAL — 522 | 10 | 15 | 4 |
| | RETAINED — 523 | 2 | 5 | 0 |
| | LOCAL POOL — 524 | ($15) 8 | ($15) 10 | ($15) 0̸ |
| SELLER1 | TOTAL — 525 | 30 | 20 | 30 |
| | RETAINED — 526 | 10 | 0 | 5 |
| | LOCAL POOL — 527 | (UNRESTRICTED) 20 | (UNRESTRICTED) 20 | (UNRESTRICTED) 25 |
| SELLER2 | TOTAL — 528 | 6 | 15 | 0 |
| | RETAINED — 529 | 0 | 0 | 0 |
| | LOCAL POOL — 530 | (UNRESTRICTED) 0̸ | (UNRESTRICTED) 0̸ | (UNRESTRICTED) 0 |

SYSTEM AND METHOD FOR ALLOCATING MANUFACTURED PRODUCTS TO SELLERS USING PROFITABLE ORDER PROMISING

CROSS-REFERENCE TO RELATED APPLICATIONS

This application is a continuation of U.S. patent application Ser. No. 15/918,138 filed on Mar. 12, 2018 and entitled "System and Method for Allocating Manufactured Products to Sellers Using Profitable Order Promising," which is a continuation of U.S. patent application Ser. No. 13/735,658 filed on Jan. 7, 2013 and entitled "System and Method for Allocating Manufactured Products to Sellers Using Profitable Order Promising," now U.S. Pat. No. 9,916,550, which is a continuation of U.S. patent application Ser. No. 12/108,947 filed on Apr. 24, 2008 and entitled "System and Method for Allocating Manufactured Products to Sellers Using Profitable Order Promising," now U.S. Pat. No. 8,352,336, which claims the benefit of U.S. Provisional Application Ser. No. 60/915,227, filed May 1, 2007, and entitled "Extending a System and Method for Allocating Manufactured Products to Sellers for Profitable to Promise." U.S. patent application Ser. No. 15/918,138, U.S. Pat. Nos. 9,916,550 and 8,352,336, and U.S. Provisional Patent Application Ser. No. 60/915,227 are assigned to the assignee of the present application. The disclosed of related U.S. patent application Ser. No. 15/918,138, U.S. Pat. Nos. 9,916,550 and 8,352,336, and U.S. Provisional Patent Application Ser. No. 60/915,227 are hereby incorporated by reference into the present disclosure as if fully set forth herein.

TECHNICAL FIELD OF THE INVENTION

This invention relates generally to supply chain management, and more particularly to a system and method for allocating manufactured products to sellers using profitable order promising.

BACKGROUND OF THE INVENTION

Manufacturing enterprises produce products to be delivered to customers, based on various needs, such as, customer orders, customer demands, or customer requests. For example, a customer order may require delivery of a particular quantity of a product by a particular date. However, manufacturing enterprises have various manufacturing constraints, such as, for example, capacity constraints and material constraints that may not allow a manufacturing enterprise to fulfill every customer order. That is, some customer orders may not receive any promises, while other customer orders may only receive inadequate promises. This inability to make promises to fulfill customer orders is undesirable.

In an effort to overcome the above-discussed deficiencies, manufacturing enterprises have tried to reserve products in an attempt to provide differentiated service levels to customers during the order promise and fulfillment process. However, these reservations are typically based on forecasts that become inaccurate due to various inadequacies with the forecasts. In addition, because these forecasts are often inaccurate, customer orders are either not promised, when they could have been or are promised but are not fulfilled. This inability to accurately make promises and fulfill customer orders is also undesirable.

SUMMARY OF THE INVENTION

A system of allocating products to one or more sellers is disclosed. The system includes a database configured to store data associated with one or more enterprises. The system further includes an order promising system tangibly embodied on a computer-readable medium, coupled with the database and is configured to model the flow of the products through the one or more enterprises, allocate resources to the one or more sellers based on the modeled flow of the products and receive a customer demand associated with the one or more sellers. The order promising system is further configured to determine a priority of the one or more sellers associated with the received customer demand and perform the following when the one or more sellers associated with the received customer demand is determined to not be at a prioritization to consume the allocations: release the allocations to the one or more sellers associated with the received customer demand when a desired system profit is based on an offer by the one or more sellers, hold the allocations as un-promised allocations when a desired system profit is zero, and borrow the allocations from a seller with a lower price for the allocations and promise the allocations to the one or more sellers associated with the received customer demand at a premium when a desired system profit is based on the premium.

A method of allocating products to one or more sellers is also disclosed. The method provides for modeling the flow of the products through one or more enterprises, allocating resources to the one or more sellers based on the modeled flow of the products and receiving a customer demand associated with the one or more sellers. The method further provides for determining a priority of the one or more sellers associated with the received customer demand and performing the following when the one or more sellers associated with the received customer demand is determined to not be at a prioritization to consume allocations: releasing the allocations to the one or more sellers associated with the received customer demand when a desired system profit is based on an offer by the one or more sellers, holding the allocations as un-promised allocations when a desired system profit is zero and borrowing the allocations from a seller with a lower price for the allocations and promise the allocations to the one or more sellers associated with the received customer demand at a premium when a desired system profit is based on the premium.

A non-transitory computer-readable medium embodied with software to allocate products to one or more sellers is also disclosed. The software when executed using one or more computers is configured to model the flow of the products through the one or more enterprises, allocate resources to the one or more sellers based on the modeled flow of the products and receive a customer demand associated with the one or more sellers. The software is further configured to determine a priority of the one or more sellers associated with the received customer demand and perform the following when the one or more sellers associated with the received customer demand is determined to not be at a prioritization to consume the allocations: release the allocations to the one or more sellers associated with the received customer demand when a desired system profit is based on an offer by the one or more sellers, hold the allocations as un-promised allocations when a desired system profit is zero, and borrow the allocations from a seller with a lower price for the allocations and promise the allocations to the one or more sellers associated with the received customer demand at a premium when a desired system profit is based on the premium.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

FIG. 5 illustrates a profitable order promising interface according to the supply chain model of FIG. 4.

DETAILED DESCRIPTION OF THE INVENTION

Reference will now be made to the following detailed description of the preferred and alternate embodiments. Those skilled in the art will recognize that the present invention provides many inventive concepts and novel features, that are merely illustrative, and are not to be construed as restrictive. Accordingly, the specific embodiments discussed herein are given by way of example and do not limit the scope of the present invention.

Figure 1:
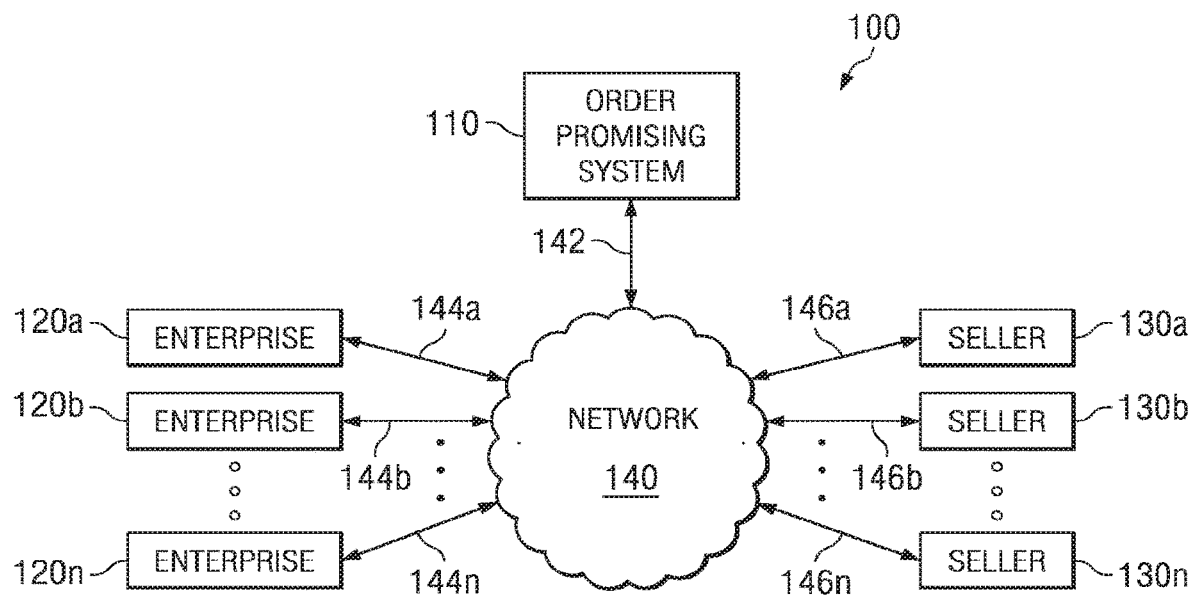
FIG. 1 illustrates an exemplary supply chain network according to a preferred embodiment.

FIG. 1 illustrates an exemplary supply chain network 100 according to a preferred embodiment. Supply chain network 100 comprises an order promising system 110, one or more enterprises 120a-120n, one or more sellers 130a-130n, a network 140, and communication links 142, 144a-144n and 146a-146n. Although a single order promising system 110, one or more enterprises 120a-120n, and one or more sellers 130a-130n, are shown and described, embodiments contemplate any number of order promising systems 110, any number of enterprises 120a-120n and/or any number of sellers 130a-130n, according to particular needs. In addition, or as an alternative, order promising system 110 may be integral to or separate from the hardware and/or software of any one of the one or more enterprises 120a-120n and/or one or more sellers 130a-130n.

In one embodiment, supply chain network 100 may model the flow of manufactured products, such as, for example, materials, items, goods, and/or services through one or more enterprises 120a-120n, one or more sellers 130a-130n, and/or any other supply chain planning environments associated with supply chain network 100. As described below, order promising system 110 may be used to allocate resources based on profitable order promising. For example, one or more enterprises 120a-120n may receive a customer demand (i.e., customer request or customer order) from one or more sellers 130a-130n. Order promising system 110 may than prioritize the allocations, associated with the received customer order based on the level of priority of the seller, associated with the received customer order.

In one embodiment, order promising system 110 may comprise multiple components, such as for example, order promising engines, optimizers, workflows, or any other like components for using profitability as a constraint for allocating manufactured products to sellers. In addition, or as an alternative, order promising system 110 may comprise one or more servers and one or more databases or other data storage arrangements at one or more locations, local to, or remote from order promising system 110, one or more enterprises 120a-120n, and one or more sellers 130a-130n and may be made available to one or more associated users of one or more enterprises 120a-120n and one or more sellers 130a-130n using network 140 or in any other appropriate manner.

In one embodiment, supply chain network 100 may operate on one or more computers that may be integral to, or separate from, the hardware and/or software that support order promising system 110, one or more enterprises 120a-120n, and one or more sellers 130a-130n. These one or more computers may include any suitable input device, such as a keypad, mouse, touch screen, microphone, or other device to input information. In addition, these one or more computers may include any suitable output device that may convey information associated with the operation of supply chain network 100, including digital or analog data, visual information, or audio information. Furthermore, these one or more computers may include fixed or removable storage media, such as magnetic computer disks, CD-ROM, or other suitable media to receive output from and provide input to supply chain network 100. In addition, these one or more computers may include one or more processors and associated memory to execute instructions and manipulate information according to the operation of supply chain network 100.

In addition, or as an alternative, order promising system 110, one or more enterprises 120a-120n, and/or one or more sellers 130a-130n may each operate on one or more separate computers or may operate on one or more shared computers. Each of these one or more computers may be a work station, personal computer (PC), network computer, personal digital assistant (PDA), wireless data port, or any other suitable computing device. In another embodiment, one or more users may be associated with one or more enterprises 120a-120n and/or one or more sellers 130a-130n. These one or more users may include, for example, a "planner" handling order promising, order fulfillment, and/or one or more related tasks within supply chain network 100. In addition, or as an alternative, these one or more users within supply chain network 100 may include, for example, one or more computers programmed to autonomously handle order promising, order fulfillment, and/or one or more related tasks within supply chain network 100.

In one embodiment, order promising system 110 may be coupled with network 140 using communications link 142, which may be any wireline, wireless, or other link suitable to support data communications between order promising system 110 and network 140 during operation of supply chain network 100. One or more enterprises 120a-120n may be coupled with network 140 using communications link 144a-144n, which may be any wireline, wireless, or other link suitable to support data communications between one or more enterprises 120a-120n and network 140 during operation of supply chain network 100. One or more sellers 130a-130n may be coupled with network 140 using communications links 146a-146n, which may be any wireline, wireless, or other link suitable to support data communications between one or more sellers 130a-130n and network 140 during operation of supply chain network 100.

Although communication links 142, 144a-144n and 146a-146n are shown as generally coupling order promising system 110, one or more enterprises 120a-120n, and one or more sellers 130a-130n to network 140, order promising system 110, one or more enterprises 120a-120n, and one or more sellers 130a-130n may communicate directly with each other, according to particular needs. In addition, or as an alternative, order promising system 110 may reside within one or more enterprises 120a-120n and/or one or more sellers 130a-130n, according to particular needs.

In another embodiment, network 140 may include the Internet and any appropriate local area networks (LANs), metropolitan area networks (MANS), or wide area networks (WANs) coupling order promising system 110, one or more enterprises 120a-120n, and one or more sellers 130a-130n. Those skilled in the art will recognize that the complete structure and operation of communication network 140 and other components within supply chain network 100 are not depicted or described. Embodiments may be employed in conjunction with known communications networks and other components.

Figure 2:
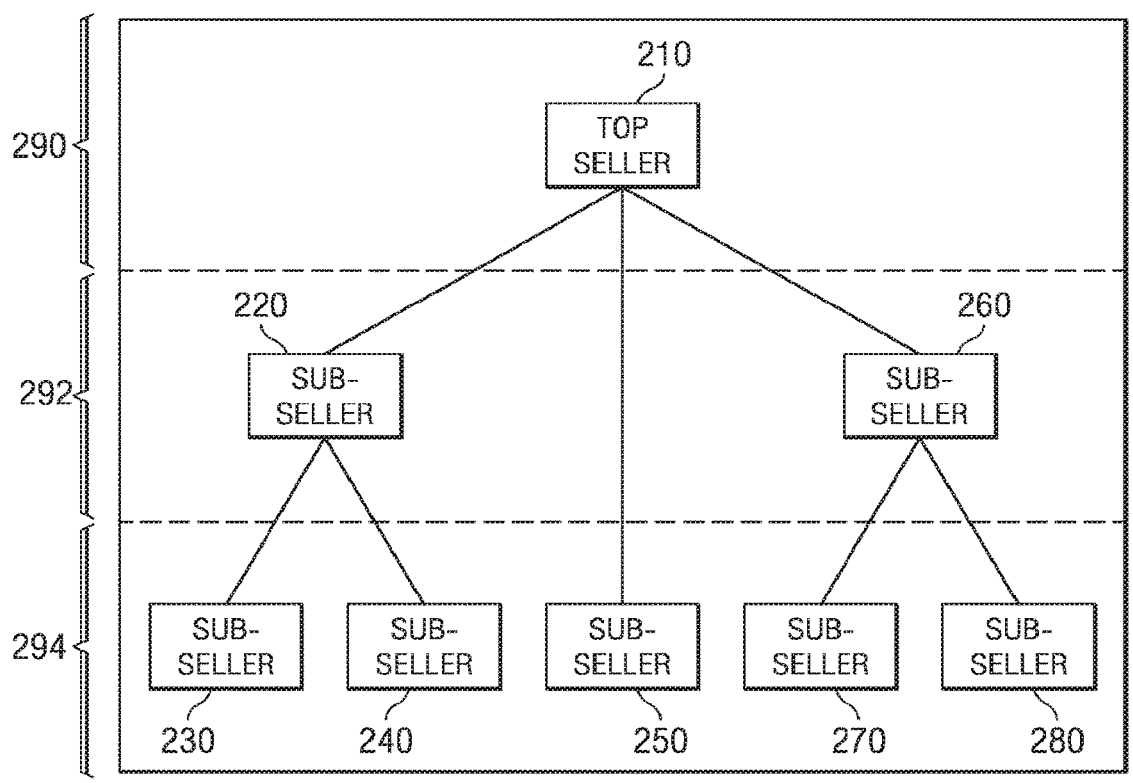
FIG. 2 illustrates a seller hierarchy according to one embodiment.

FIG. 2 illustrates a seller hierarchy 200, according to one embodiment. Seller hierarchy 200 comprises a top seller 210, sub-sellers 220-280, and seller tiers 290-294. In one embodiment, order promising system 110 may provide a seller hierarchy model that represents a hierarchy of sellers, such as, for example, seller hierarchy 200. In addition, or as an alternative, the seller hierarchy model may be stored in one or more databases or other data storage arrangements associated with order promising system 110. The seller hierarchy model may represent a different hierarchy of sellers for each product associated with one or more enterprises 120a-120n. Although, seller hierarchy 200 is shown and described as comprising a particular hierarchy of sellers, embodiments contemplate any suitable hierarchy of sellers, according to particular needs.

As an example only and not by way of limitation, top seller 210 may represent a seller (i.e., one or more sellers 130a-130n) associated with the worldwide sales of a manufacturing enterprise, such as, for example, any one of the one or more enterprises 120a-120n. Sub-seller 220 may represent a seller associated with the sales of the manufacturing enterprise to a particular customer, such as, for example, customer A. Sub-sellers 230-240 may represent sellers associated with the sales of the manufacturing enterprise to one or more business units of customer A. Sub-seller 250 may represent a seller associated with the sales of the manufacturing enterprise to another customer, such as, for example, customer B. Sub-seller 260 may represent a seller associated with the sales of the manufacturing enterprise to another customer, such as, for example, customer C. Sub-sellers 270 and 280 may represent sellers associated with the sales of the manufacturing enterprise to one or more business units of customer C.

In one embodiment, one or more enterprises 120a-120n may make allocations to any level in the hierarchy of sellers. Sellers may use these allocations for themselves or any of the members associated with the hierarchy of sellers, depending upon allocation policies of the seller hierarchy model. In addition, or as an alternative, a seller, in the hierarchy of sellers, may act as an agent of one or more enterprises 120a-120n and make promises for those enterprises. In addition, sellers may manage orders and promises for a single manufactured product or multiple manufactured products, that is, each product may be managed independently, or grouped together with other manufactured products into product groups. These orders and promises are aggregated up to the top seller, of the hierarchy of sellers, such that the demand at the top seller may then be placed as a customer demand for the hierarchy of sellers. In another embodiment, a seller, in the hierarchy of sellers, is committed to anything its sub-sellers is committed to, that is, with reference to FIG. 2, top seller 210 is committed to anything sub-sellers 220-280 is committed to, sub-seller 220 is committed to anything sub-sellers 230-240 is committed to, and sub-seller 260 is committed to anything sub-sellers 270-280 is committed to.

In one embodiment, one or more enterprises 120a-120n may categorize the seller hierarchy model into various seller tiers. That is, the sellers, in the hierarchy of sellers, may have an associated rank used to prioritize the allocations. Seller tier 290 may comprise top seller 210, seller tier 292 may comprise sub-sellers 220 and 260, and seller tier 294 may comprise sub-sellers 230-250 and 270-280. In addition, or as an alternative, sellers with a higher prioritization may receive their allocations before the allocation goes to sellers with lower prioritization. As an example only and not by way of limitation, if the allocated amount associated with seller tier 292 (i.e., top seller 210) is less than what is needed by seller tiers 292-294 (i.e., sub-sellers 230-280), the allocation may be distributed among the sellers as specified by profitable order promising, as discussed below in more detail. Although, seller hierarchy 200 is shown and described as comprising various seller tiers, embodiments contemplate any suitable categorization of sellers that provide for prioritization into ranks, tiers, groups, or the like.

Figure 3:
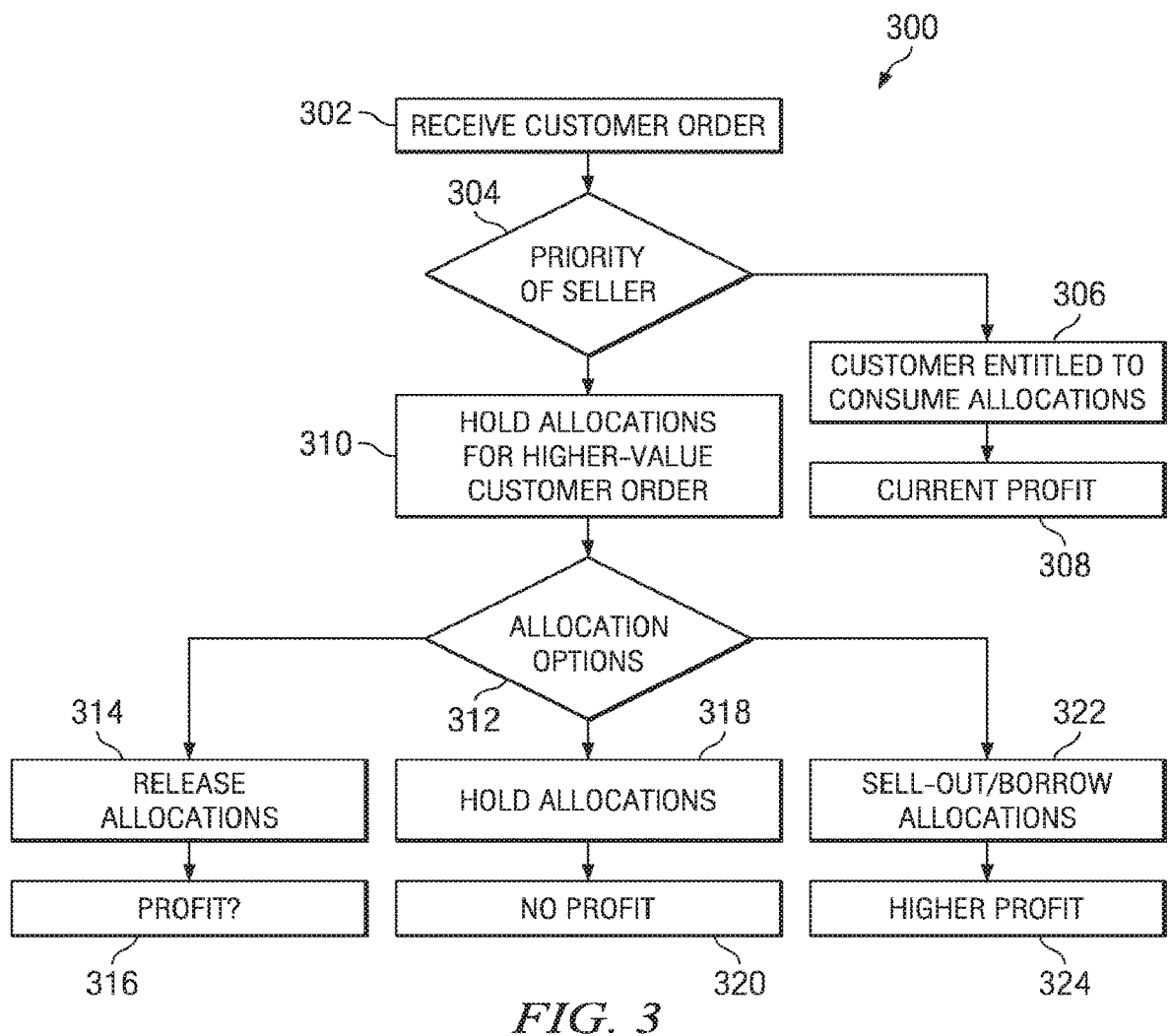
FIG. 3 illustrates an exemplary method for allocating manufactured products to sellers using profitable order promising.

FIG. 3 illustrates an exemplary method 300 for allocating manufactured products to sellers using profitable order promising. The method begins at step 302, where a customer order associated with one or more sellers 130a-130n is received at one or more enterprises 120a-120n. As discussed above, order promising system 110 may provide a seller hierarchy model that represents a hierarchy of sellers, wherein one or more sellers 130a-130n may provide customer orders to one or more enterprises 120a-120n, who may in turn, provide allocations at any level in the hierarchy of sellers.

At step 304, order promising system 110 determines the priority of the seller associated with the received customer order. As discussed above, the sellers, in the hierarchy of sellers, may have an associated rank, which may be used to prioritize allocations. That is, sellers with a higher prioritization may receive allocations prior to allocation provided to sellers with lower prioritization. Order promising system 110 may determine the level of priority of the seller associated with the received customer order, at step 304. If order promising system 110 determines that the seller associated with the received customer order, is at a prioritization to consume the allocations, the method proceeds to step 306. At step 306, order promising system 110 promises the allocations to the seller associated with the received customer order. Among other things, this preserves customer commitments previously made with higher prioritized sellers and fulfills any backlog associated with previous commitments.

At step 308, the profit associated with the received customer order and promised at step 306, is based on various contractual commitments previously made between the one or more enterprises 120a-120n and the seller associated with the received customer order. If order promising system 110 determines that the seller associated with the received customer order, is not at a prioritization to consume the allocations, the method proceeds to step 310.

At step 310, because the allocation associated with the received customer order was not promised, order promising system 110 holds the allocation for a higher-value customer order based on profitable order promising (i.e., profitable-to-promise). At step 312, a determination is made as to the allocation of the manufactured products associated with the received customer request. Order promising system 110 may determine to release the allocations to the seller associated with the received customer order, even though the priority of the seller may not meet a particular threshold, the method may than proceed to step 314. At step 314, order promising system 110 releases the allocations and promises the allocations to the seller associated with the received customer order. At step 316, the profit associated with the received customer order and promised at step 306, is based on an amount offered by the seller, which may be less than or more than a higher-value customer order.

Order promising system 110 may determine to hold the allocations and not to allow the seller associated with the received customer order, to consume the allocations, the method may than proceed to step 318. At step 318, order promising system 110 holds the allocations and leaves the capacity associated with this particular allocation un-promised. At step 320 the profit associated with holding the allocations is zero.

Order promising system 110 may determine to sell-out or borrow the allocations to the seller associated with the received customer order, the method may than proceeds to step 322. At step 322, order promising system 110 may determine that the seller associated with the received customer order is willing to pay a premium for the allocation and promises the allocations to the seller associated with the received customer. At step 324, the profit associated with the received customer order and promised at step 322, is based on the premium amount offered by the seller. Once a determination of the allocation has been, the method ends. In addition, although, FIG. 3 illustrates one embodiment of a method for allocating manufactured products to sellers using profitable order promising, various changes may be made to method 300 without departing from the scope of embodiments of the present invention.

Figure 4:
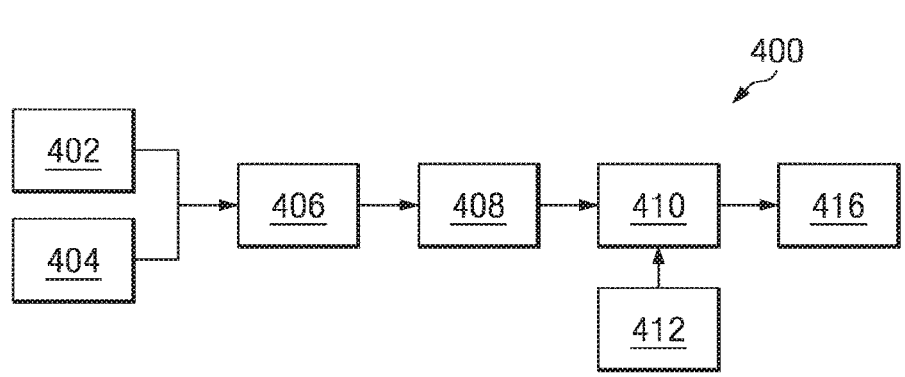
FIG. 4 illustrates a supply chain model according to one embodiment.

FIG. 4 illustrates a supply chain model 400, according to one embodiment. Supply chain model 400 comprises raw materials 402 and 404, routing 406 and 410, intermediate product 408, resource 412, and finished product 416. Although raw materials 402 and 404, routing 406 and 410, a single intermediate product 408, a single resource 412, and a single finished product 416, are shown and described, embodiments contemplate any number of raw materials 402 and 404, any number of routings 406 and 410, any number of intermediate products 408, any number of resources 412, and any number of finished products 416, according to particular needs.

In one embodiment, order promising system 110 represents a supply chain model 400 of one or more enterprises 120a-120n. Supply chain model 400 may produce a finished product 416 from an intermediate product 408 using one unit of resource 412. In addition, routing 412 may take a particular period of time to produce finished product 416, such as, for example, 1 week. Intermediate product (IP) 408 may be a combination of raw material 402 and 404 and may take a particular period of time to produce intermediate product 408 (i.e., routing 406), such as, for example, 2 weeks.

FIG. 5 illustrates a profitable order promising interface 500 according to supply chain model 400 of FIG. 4. Profitable order promising interface 500 may comprise one or more graphical elements including available-to-promise buckets 510 and allocations 520. Although, profitable order promising interface 500 is shown and described as having one or more graphical elements including a visual representation of a plurality of available-to-promise bucket 510 elements and a plurality of allocation 520 elements, embodiments contemplate any suitable number of graphical elements, according to particular needs. As will be explained below in greater detail, profitable order promising interface 500 may provide a visual representation of a rule based workflow, according to particular needs.

In one embodiment, available-to-promise buckets 510 may provide the available supply associated with supply chain model 400. Available-to-promise buckets 510 may be based on a particular time horizon, such as, for example, every day, every week, every month, or any other like time horizon. As an example only and not by way of limitation, available-to-promise buckets 510 may comprise finished product manufactured (FP Manufact.) 511, finished product in-process (FP In-Process) 512, finished product total (FP Total) 513, intermediate product manufactured (IP Manufact.) 514, intermediate product in-process (IP In-Process) 515, intermediate product total (IP Total) 516, resource (Res) 517 and raw materials (RM1 and RM2) 518 and 519. Although, example available-to-promise buckets 510 are shown and described, embodiments contemplate any other suitable available-to-promise buckets, such as, for example, supplier inventory, logistical capacity, consigned inventory, available to promise supply, and/or any other available-to-promise buckets, according to particular needs.

In another embodiment, allocations 520 may provide the allocations of supply associated with supply chain model 400. Allocations 520 may be based on a particular time horizon, such as, for example, every week, every month, every year, or any other like time horizon. As an example only and not by way of limitation, allocations 520 may comprise the total supply (Total Supply) 521 of resource (Res) 517, for the time horizon associated with allocations 520. Total supply (Total Supply) 521 may provide for how the supply of resource (Res) 517 is to be reserved across the hierarchy of sellers.

Allocations 520 may also comprise top seller total (Total) 522, top seller retained (Retained) 523, top seller local pool (Local Pool) 524, seller1 total (Total) 525, seller1 retained (Retained) 526, seller1 local pool (Local Pool) 527, seller2 total (Total) 528, seller2 retained (Retained) 529, and seller2 local pool (local Pool) 530. In addition, as discussed above, order promising system 110 may provide a seller hierarchy model that represents a hierarchy of sellers, such as, for example, seller hierarchy 200 of FIG. 2. Accordingly, the top seller may be, for example, top seller 210, seller1 may be, for example, sub-seller 220, and seller2 may be, for example, sub-seller 250. In addition, the top seller is provided access to all of the supply, but may choose to reserve a portion of the supply to seller1 of and/or seller2. In essence, any supply that is not retained by, for example, the top seller is available to the children associated with top seller. Although example allocations 520 are shown and described, embodiments contemplate any suitable allocations and/or any combination of allocations, according to particular needs.

In one embodiment, allocations 520 may comprise a nested structure associated with allocations 520. This nested structure may comprise one or more parameters coupled with the particular allocation of resources for providing profitable order promising. As an example only and not by way of limitation, the one or more parameters may be associated with a cost point, profits, margins, carbon footprint resources, and other like parameters. In another embodiment, the one or more parameters may be determined by one or more enterprises 120a-120n, for each of the hierarchy of sellers and for each of the particular time horizons. In addition or as an alternative, the one or more parameters for one seller may be different than the one or more parameters for another seller and the one or more parameters for one seller tier may be different than the one or more parameters for another seller tier. In addition, the one or more parameters may be either internally stored in order promising system 110 and/or stored in a look-up table in one or more databases associated with supply chain network 100. Although, example parameters are shown and described, embodiments contemplate any suitable parameter and/or any combination of parameters, according to particular needs.

In another embodiment, order promising system 110 may adjust the one or more parameters, after the initial parameter is determined, based on, for example, shifting supply, demand conditions, and/or other like changes in supply chain network 100. In addition or as an alternative, the one or more adjusted parameters may be either internally stored in order promising system 110 and/or stored in a look-up table in one or more databases associated with supply chain network 100. In addition, order promising system 110 may adjust the one or more parameters using an order promising engine and/or an optimizer associated with order promising system 110.

To further explain the operation of profitable order promising interface 500, an example is now given. In the following example, there are 46 units of total supply 521 of resource (Res) 517 in allocations 520 for month 1. That is, there are 10 units of resource (Res) 517 in week 1, there are 11 units of resource (Res) 517 in week 2, there are 12 units of resource (Res) 517 in week 3, and there are 13 units of resource (Res) 517 in week 4. Out of the 46 units of total supply 521 of resource (Res) 517a in allocations 520 for month 1, 10 units are allocated for top seller total 522, 2 units are retained by the top seller at top seller retained 523, and 8 units are placed in the local pool by the top seller at top seller local pool 524 and are available to the top seller, seller1, and seller2, according to particular needs.

In addition, out of the 46 units of total supply 521 of resource (Res) 517 in allocations 520 for month 1, 30 units are allocated for seller1 total 525, 10 units are retained by seller1 at seller1 retained 526, and 20 units are placed in the local pool by seller1 at seller1 local pool 527 and are available to top seller and seller1, according to particular needs. Furthermore, out of the 46 units of total supply 521 of resource (Res) 517 in allocations 520 for month 1, 6 units are allocated for seller2 total 528, 0 units are retained by seller2 at seller2 retained 529, and 6 units are placed in the local pool by seller2 at seller2 local pool 530 and are available to the top seller and seller2, according to particular needs.

Continuing with this example, a demand (i.e., customer order) is received at seller2 which requires 90 units due week 7, at a margin of $10 per unit. Although, in this example, a particular demand is associated with seller2, a demand may be received from any member of the hierarchy of sellers, at any time, and for any parameter. In addition, in this example finished product manufactured (FP Manufact.) 511 is quantified as unrestricted supply, that is, finished product manufactured (FP Manufact.) 511 is not currently allocated and is available to any member of the hierarchy of sellers. Furthermore, in this example, the one or more parameters coupled with allocations 520 for providing profitable order promising, is a margin determined by one or more enterprises 120a-120n. In this example, the margin determined for seller2 local pool 530 is "unrestricted", the margin determined for top seller local pool 524 is $15 for month 1 and 2, and $10 for month 3. Although, an example parameter is shown and described in FIG. 5, embodiments contemplate any suitable parameter and/or any combination of parameters, according to particular needs.

In order to provide profitable order promising, order promising system 110 allocates the finished product manufactured (FP Manufact.) 511 of available-to-promise buckets 510 starting at week 7 through week 1, for a total of 46 units. Next, order promising system 110 allocates the 15 units available in the local pool at seller2 local pool 530 for month 2 and allocates the 6 units available in the local pool at seller2 local pool 530 for month 1. However, because, in this example, top seller local pool 524 is restricted to a margin of $15 for month 1 and 2 and the received demand is for a margin of $10 per unit, order promising system 110 is not able to allocate the remaining 5 units by week 7. Order promising unit may allocate 4 units available in the top seller local pool 524 for month 3, because the 4 units available in the top seller local pool 524 for month 3 have a margin of $5 and the received demand is for a margin of $10 per unit. Accordingly, order promising system 110 may allocate (promise) 85 units in week 7 and 4 units in month 3, leaving 1 unit un-promised.

In one embodiment, order promising system 110 may generate one or more reports and communicate these one or more reports to the seller associated with the demand or any member of the hierarchy of sellers. In addition, or as an alternative, these one or more reports may provide for the status of the allocations and may include, for example, a root cause report, a reasoning report, and/or any other report. In addition, these reports may describe why a particular demand was not allocated or was allocated short or late, relative to the customer request (i.e., customer order). In the above example, order promising system 110 may generate a report describing why the 4 units will not be allocated until month 3 and/or why the 1 unit remains un-promised. In addition, order promising system 110 may enable one or more workflows to launch resolution procedures in order to resolve why a particular demand was not allocated.

Modifications, additions or omissions may be made to profitable order promising interface 500 without departing from the scope of the invention. As an example and not by way of limitation, profitable order promising interface 500 may have more, fewer, or other graphical elements, available-to-promise buckets, and/or allocations. Moreover, the operation of profitable order promising interface 500 may be performed by more, fewer, or other graphical elements, arranged in any suitable manner, according to particular needs.

Reference in the foregoing specification to "one embodiment", "an embodiment", or "another embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for allocating products to one or more sellers, comprising:
   a graphical user interface, one or more rule based workflows and an order promising system tangibly embodied on a non-transitory computer-readable medium and coupled with a database, the order promising system configured to:
   receive data over a computer network from one or more enterprises comprising an amount of available supply;

allocate to each seller of the one or more sellers, an allocation of the products based on the available supply, the allocation of the products comprising a local pool allocation associated with one or more adjustable parameters;

display the local pool allocation of the products based on the available supply on the graphical user interface, wherein the graphical user interface provides a visual representation of one or more rule based workflows;

monitor the one or more enterprises for a customer demand received over the computer network by one of the one or more sellers;

responsive to the received customer demand, update the local pool allocation of the products based on the available supply and display the updated local pool allocation of the products based on the available supply on the graphical user interface; and launch one or more resolution procedures, by the one or more rule-based workflows.

2. The system of claim 1, wherein the order promising system is further configured to determine a priority of one or more sellers based on a seller hierarchy model representing the one or more sellers and wherein the received customer demand comprises a due date.

3. The system of claim 2, wherein responsive to the received customer demand, the order promising system releases the customer demand to one of the one or more sellers by:

releasing the local pool allocation at the same or higher priority of the one of the one or more sellers for a period of the time horizon less than the due date; and releasing the available supply for a period of the time horizon less than the due date.

4. The system of claim 1, wherein one or more adjustable parameters is coupled to the local pool allocation, and each of the one or more adjustable parameters coupled to the local pool allocation comprises a threshold for releasing the local pool allocation.

5. The system of claim 4, wherein the order promising system further:

receives a customer demand comprising a value for one of the one or more adjustable parameters; and releases the customer demand to the one of the one or more sellers by:

releasing the local pool allocation at the same or higher priority of the one of the one or more sellers when the customer demand adjustable parameter value is at least equal to the threshold for releasing the local pool allocation; and releasing the available supply.

6. The system of claim 5, wherein the order promising system further:

adjusts the one or more adjustable parameters based on one or more of a change in demand and a change in supply.

7. The system of claim 6, wherein an order promising engine adjusts the one or more adjustable parameters.

8. A computer-implemented method for allocating products to one or more sellers, comprising:

receiving data over a computer network from one or more enterprises comprising an amount of available supply;

allocating to each seller of the one or more sellers, an allocation of the products based on the available supply, the allocation of the products comprising a local pool allocation associated with one or more adjustable parameters;

displaying on a graphical user interface, the local pool allocation of the products based on the available supply, wherein the graphical user interface provides a visual representation of one or more rule based workflows;

monitoring the one or more enterprises for a customer demand received over the computer network by one of the one or more sellers;

responsive to the received customer demand, updating the local pool allocation of the products based on the available supply and displaying the updated local pool allocation of the products based on the available supply on the graphical user interface; and launch one or more resolution procedures, by the one or more rule-based workflows.

9. The computer-implemented method of claim 8, further comprising determining a priority of one or more sellers based on a seller hierarchy model representing the one or more sellers and wherein the received customer demand comprises a due date.

10. The computer-implemented method of claim 9, wherein responsive to the received customer demand, the customer demand is released to one of the one or more sellers by:

releasing the local pool allocation at the same or higher priority of the one of the one or more sellers for a period of the time horizon less than the due date; and releasing the available supply for a period of the time horizon less than the due date.

11. The computer-implemented method of claim 8, wherein one or more adjustable parameters is coupled to the local pool allocation, and each of the one or more adjustable parameters coupled to the local pool allocation comprises a threshold for releasing the local pool allocation.

12. The computer-implemented method of claim 11, further comprising:

receiving a customer demand comprising a value for one of the one or more adjustable parameters; and releasing the customer demand to the one of the one or more sellers by:

releasing the local pool allocation at the same or higher priority of the one of the one or more sellers when the customer demand adjustable parameter value is at least equal to the threshold for releasing the local pool allocation; and releasing the available supply.

13. The computer-implemented method of claim 12, further comprising:

adjusting the one or more adjustable parameters based on one or more of a change in demand and a change in supply.

14. The computer-implemented method of claim 13, wherein an order promising engine adjusts the one or more adjustable parameters.

15. A non-transitory computer readable medium embodied with software for allocating products to one or more sellers, the software when executed using one or more computers:

receives data over a computer network from one or more enterprises comprising an amount of available supply;

allocates to each seller system of the one or more sellers, an allocation of the products based on the available supply, the allocation of the products comprising a local pool allocation associated with one or more adjustable parameters;

displays on a graphical user interface, the local pool allocation of the products based on the available supply, wherein the graphical user interface provides a visual representation of one or more rule based workflows;

monitors the one or more enterprises for a customer demand received over the computer network by one of the one or more sellers;

responsive to the customer demand, update the local pool allocation of the products based on the available supply and display the updated local pool allocation of the products based on the available supply on the graphical user interface; and launch one or more resolution procedures, by the one or more rule-based workflows.

16. The non-transitory computer-readable medium of claim 15, wherein the software further determines a priority of one or more sellers based on a seller hierarchy model representing the one or more sellers and wherein the received customer demand comprises a due date.

17. The non-transitory computer-readable medium of claim 16, wherein responsive to the received customer demand, the software further releases the customer demand to the one of the one or more sellers by:

releasing the local pool allocation at the same or higher priority of the one of the one or more sellers for a period of the time horizon less than the due date; and releasing the available supply for a period of the time horizon less than the due date.

18. The non-transitory computer-readable medium of claim 17, wherein one or more adjustable parameters is coupled to the local pool allocation, and each of the one or more adjustable parameters coupled to the local pool allocation comprises a threshold for releasing the local pool allocation.

19. The non-transitory computer-readable medium of claim 18, wherein the software further:

receives a customer demand comprising a value for one of the one or more adjustable parameters; and releases the customer demand to the one of the one or more sellers by:

releasing the local pool allocation at the same or higher priority of the one of the one or more sellers when the customer demand adjustable parameter value is at least equal to the threshold for releasing the local pool allocation; and releasing the available supply.

20. The non-transitory computer-readable medium of claim 19, wherein the one or more products comprise at least one of a manufactured product, a finished product, an intermediate product, or a resource.

* * * * *